Dec. 14, 1965  F. R. QUINN  3,223,041
PUMP CONTROL SYSTEM
Filed Feb. 8, 1963  3 Sheets-Sheet 1
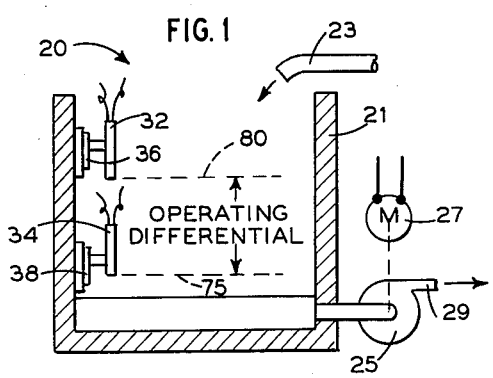
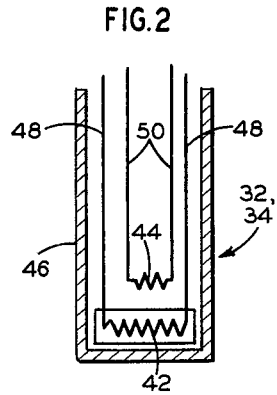
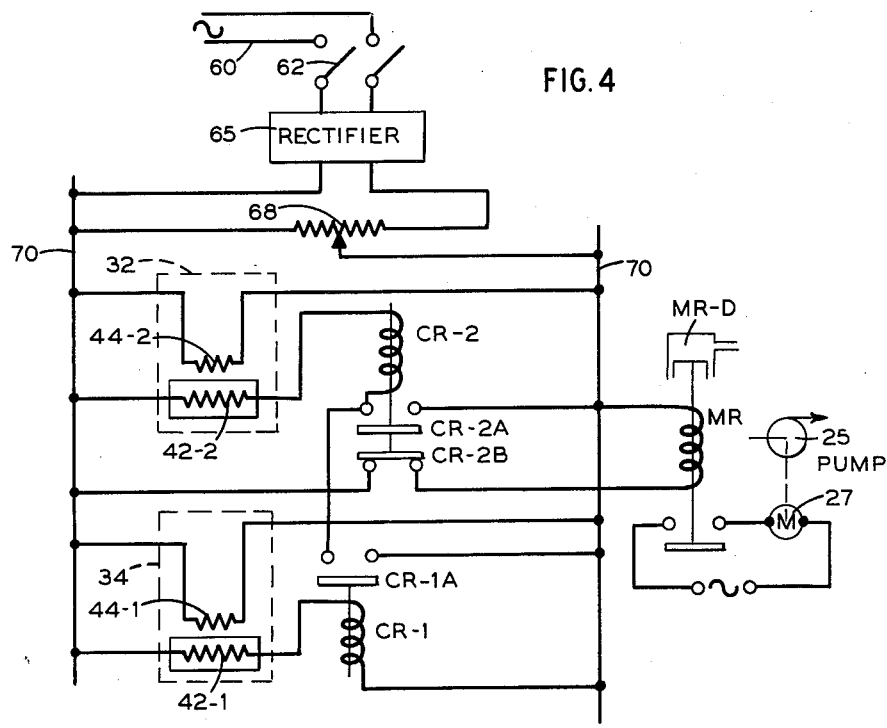
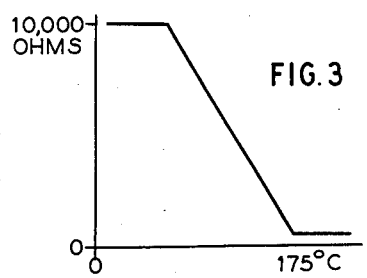
INVENTOR.
Frederic R. Quinn
BY
ATTORNEY INVENTOR.
Frederic R. Quinn
BY Irving Seidman
ATTORNEY United States Patent Office 3,223,041
Patented Dec. 14, 1965

3,223,041
PUMP CONTROL SYSTEM
Frederic R. Quinn, Red Hook, N.Y., assignor to Zyrotron
Industries, Inc., Red Hook, N.Y., a corporation
Filed Feb. 8, 1963, Ser. No. 257,244
11 Claims. (Cl. 103—11)

This invention relates to liquid level and pump control systems, and is directed particularly to a liquid level control system in which an adequate operating differential is desired and provided. In order to provide such operating differential, when a pump is started into operation because the liquid being controlled has reached a certain level, it is desired that the pump continue and maintain its pumping operation until the liquid level has been shifted to a level spaced from the original level at which the initiation of the pump occurred.

In the case of a system in which the liquid is to be pumped out of a container or reservoir, in order to lower the liquid level after it reaches a certain level, the pumping will continue until the liquid level is lowered to a low level at a predetermined distance below the initiating level. The distance between such initiating level and such low level represents the operating differential for the system as adjusted.

In a system in which the liquid is to be pumped into a container or reservoir, to keep the level from dropping below a predetermined level, the pumping system is operated to raise the liquid level to a predetermined height above the initiating low level. Here, again, the distance between the initiating low level and the cut-off high level represents the operating differential for the pumping system.

A main object of this invention is to provide a pump control system that will assure a predetermined operating differential, so that a pump when once put into operation will continue pumping until the level of the liquid will be shifted to some other predetermined level for which the circuit equipment has been adjusted.

Another object of the invention is to provide a liquid level control system with special circuit arrangements to achieve certain desired operating conditions with a minimum number of components.

Another object of the invention is to provide a liquid level sensor or detector for directly controlling the operation of the system.

A further object of the invention is to provide a liquid level sensor utilizing a resistive element that has a resistance-temperature characteristic which changes its resistance value with temperature above ambient temperature, so the change in resistivity of such resistive element may be utilized according to the temperature of said element in controlling appropriate components of the system.

Another object of the invention is to provide a pump control system utilizing a single motor operated pump with a simple relay system controlled by two independent level sensors adjustably positionable to predetermine a desired operating differential in the system.

Another object of the invention is to provide a second modification of a control system, in which more than one pump may be utilized for controlling the liquid level. In such modification, a second liquid pump serves as a back-up pump to aid the regularly operating pump under conditions when the pumping operation would excessively load, or not provide sufficient time for operation of, the normally operating pump.

Another object of the invention is to provide a system having extreme flexibility in its arrangement so that it will permit the pumping motor or motors to be controlled for either on or off stand-by operations, thereby enabling the system to be applied for either pump-out operations or for pump-in operations with respect to the reservoir in which the liquid level is to be controlled.

The manners in which the sensors operate to control a pump or pumps in the systems in which they are ultilized, to control the liquid levels in those systems, are explained in the following specification, taken in connection with the accompanying drawings, in which FIGURE 1 is a schematic view of a reservoir and pumping system provided with two liquid level sensors disposed to establish a predetermined desired operating differential;

FIG. 2 is a schematic longitudinal sectional view of a temperature-sensitive resistive element utilized in the system;

FIGURE 3 is a qualitative graph illustrating the general functional relationship or resistance-temperature characteristic of the resistive element of FIGURE 2;

FIGURE 4 is a schematic diagram of one circuit arrangement for controlling a single pump in the system utilizing two sensors and two control relays, with the system arranged for a normally disconnected pump motor for a system in which liquid is to be pumped out to prevent the liquid level from exceeding a predetermined level;

Figure 6:
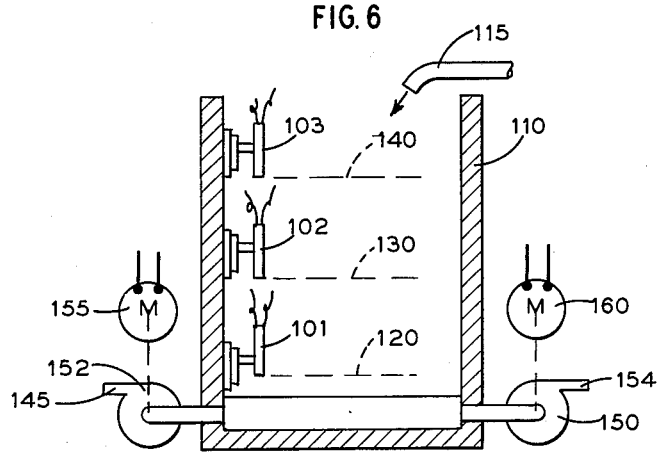
Figure 7:
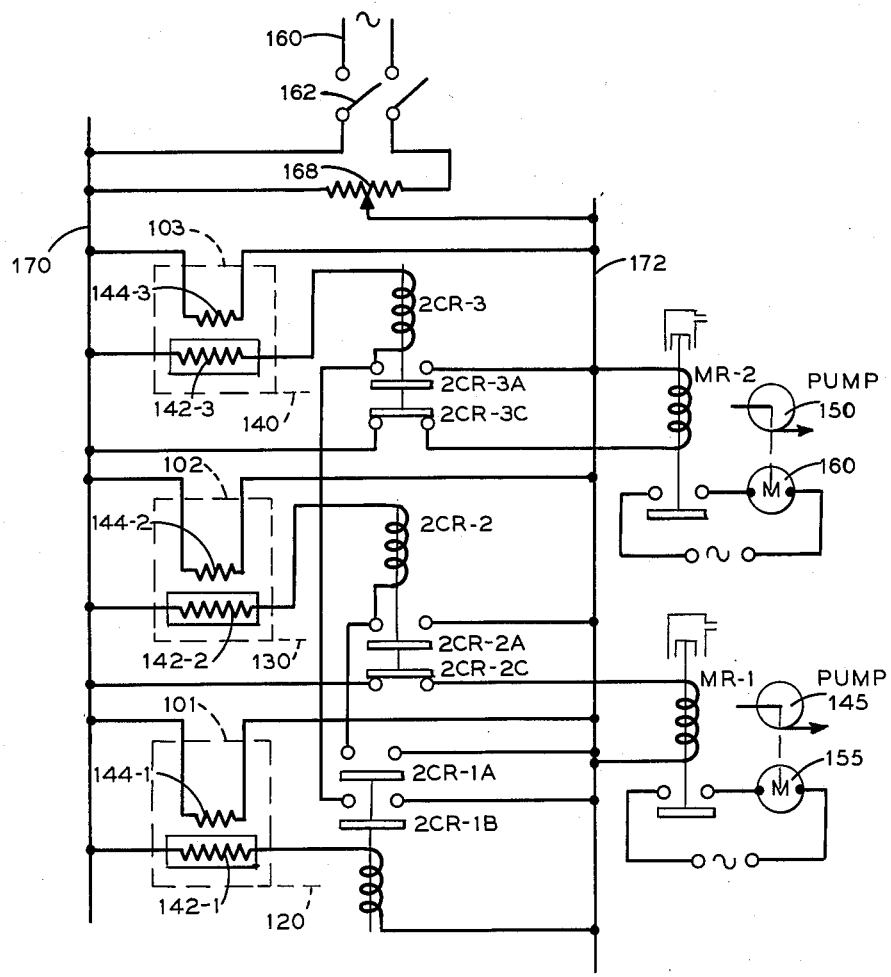

FIGURE 6 is a schematic view similar to FIGURE 1 but showing the arrangement of three sensors for use in a control system for two pumps for controlling the liquid level; and FIGURE 7 is a schematic diagram similar in type to that shown in FIGURE 4, but provided with components and elements arranged to control two pumps for maintaining desired liquid livel conditions in the system included in the arrangement shown in FIGURE 6.

As illustrated schematically in FIGURE 1, the liquid in a reservoir 20, within a suitable container 21, is to be controlled to maintain the liquid level within the vessel 21 from exceeding a predetermined safe level. Merely for convenience of illustration, the liquid is shown entering the container or vessel 21 from some inlet conduit 23. To withdraw liquid from the vessel 21, to control the liquid level, a pump 25 is schematically shown connected to the bottom of the vessel and the pump 25 is operated by a suitable motor indicated for simplicity in this case as an electric motor 27. The liquid withdrawn from the vessel 21 by the pump 25 is then supplied to an outlet conduit 29 for further disposition with which this invention is not involved.

In order to control the operation of the pump motor 27, and to determine the limits of an operating differential or space between liquid levels that will determine the on and off points at which the motor will be suitably controlled, two sensors 32 and 34 are disposed within the vessel 21 at suitable desired locations, according to the adjustments of their respective supporting brackets 36 and 38, so the bottom end faces of those two sensors 32 and 34 will be located at approximately the liquid levels which are to locate the two ends of the operating differential or space within which a liquid level may freely fluctuate without starting and stopping the motor for unnecessary operations to prevent excess liquid accumulation beyond a predetermined limit, so long as the level of the liquid is variably adjusting itself within such space defining the operating differential, according to the normal operating sequences of the system.

The two sensors 32 and 34 are similar and are constructed as schematically indicated in FIGURE 2. As there shown, each sensor 32 or 34 comprises a temperature-sensitive resistive element 42, a heating element 44 to heat the temperature-sensitive resistive element 42 and a suitable enclosure 46 of any suitable heat-conductive material, such as metal, which is sealed so that it may protect and shield the resistive element 42 and the heating element 44 from the liquid with which the sensors will be operating.

The sensor 32 or 34 also includes two conductors 48 connected to the temperature-sensitive resistive element 42 and two conductors 50 connected to the heating element 44 for connection to external circuits.

The temperature-sensitive resistive element 42 is one of the type disclosed and described in U.S. Patent No. 2,609,470 issued to me September 2, 1952 and assigned to General Electric Company. FIGURE 8 of that patent, reproduced here as FIGURE 3, illustrates qualitatively how the resistance decreases with increase in temperature. Inversely, a drop in the temperature of the element causes a substantial increase in resistance. The two values of the resistance are employed herein to control the energization and operation of control relays in the pump motor control system.

The heating element 44 establishes the elevated temperature in resistive element 42, and the liquid whose level is to be controlled serves to cool the resistive element 42 by convection through the enclosure 46.

When the sensor or probe 32 is above the liquid level and exposed only to the ambient air, the heating element 44 will raise the temperature of the resistive element 42 to a predetermined temperature sufficient to reduce the resistance of the resistive element 42 to a low value of the order of a fraction of an ohm. When the sensor or probe 32 becomes immersed in the rising liquid, the low temperature of the liquid will cause the sensor casing 46 and the resistive element 42 to cool, whereupon the resistance of the element 42 will be increased in accordance with the curve shown in FIGURE 3 to a value which may be as high as several thousand ohms. The sensor or probe 32 thus functions substantially as a liquid level switch. Considered as a switch, it is turned "on" when the liquid level is below the bottom surface of the probe, since the heater 44 raises the temperature of the resistive element 42 to a value at which the resistance is low. Again as a switch, it is turned "off" when the liquid level rises to engage the bottom surface of the sensor and cools the sensor to a low temperature at which the resistance is high.

When the temperature of the resistive element 42 is high, so that the resistance of that element is low, the element 42 is capable of conducting up to a fraction of an ampere of direct current, and therefore may be used directly in the circuit of a relay coil to control the energization of that coil and the operation of the associated relay switch.

The sensor may therefore be utilized directly without the addition of any electronic or magnetic amplifiers, and thus permits various industrial control elements to be combined into a simple control system with a minimum number of components.

Since the sensor has no mechanical moving parts, the various elements as shown in FIGURE 2 can be readily encapsulated within its metallic container, which is made of a corrosion-resistant alloy, so the complete sensor provides and constitutes a rugged component assuring highly reliable operation with a minimum of maintenance required.

The manner in which such sensor may be utilized in a simple circuit is shown in the schematic diagram of FIGURE 4 for controlling a single pump when the sensors are arranged in superposed position as illustrated, for example, in FIGURE 1, and indicated in FIGURE 4.

As shown in FIGURE 4, an ordinary power and light supply circuit 60 of the usual voltage of 110 to 115 volts supplies energy through a switch 62 and a rectifier 65 to a potentiometer 68 and a control circuit 70, of about 12 to 15 volts. The two sensors 32 and 34 are shown connected to the control circuit 70 for controlling the energization of two control relays CR–1 and CR–2. The operating coil of each control relay CR–1 or CR–2 is controlled by the temperature-sensitive resistive element 42 of the associated sensor 34 or 32.

The lower liquid level sensor 34 at the lower level includes the resistive element 42–1 and the heater element 44–1 as shown in the functional detail of FIGURE 2. Similarly, the upper sensor 32 includes a resistive element 42–2 and a heater element 44–2.

The heater elements 44–1 and 44–2 for the respective control relays are permanently connected to the supply circuit 70 to be always in operation. The resistive elements 42–1 and 42–2 are connected as indicated, the resistor 42–1 and coil of the lower control relay CR–1 in series connection being permanently connected to the supply circuit 70, and the resistor 42–2 and its relay coil in series connection being connected through front contact switch CR–1A of relay CR–1 to circuit 70.

Referring to FIGURE 1 for a moment, in connection with the diagram of FIGURE 4, it will be seen that, so long as the liquid level is below the lower end of the lower sensor 34, the resistive element 42–1 in FIGURE 4 will be at a high temperature due to the effect of the heating element 44–1, and the resistance of the resistor 42–1 will be low. Consequently, control relay CR–1 will be energized. That control relay will thereupon close its front contact CR–1A shown connected in the circuit of the upper control relay CR–2.

Since the liquid level is below the bottom of the lower sensor, the resistor 42–2 in the upper sensor 32 will also be heated to its high temperature and therefore have a low resistance. The control relay coil of CR–2 will therefore be energized through the low resistance element 42–2 as soon as the switch CR–1A of the bottom control relay CR–1 is closed. The upper control relay CR–2 will thereupon close its own front contact CR–2A shown in circuit with the coil and the resistor 42–2, thereby locking-in the upper control relay CR–2.

Operation of the upper control relay CR–2 to its energized position will open its back contact CR–2B, which will thereupon open the circuit to the motor relay MR for the pump motor 27, as indicated by the circuit and legend at the right hand side of FIGURE 4.

Thus, with the relay circuitry connected to the sensors as shown in FIGURE 4, the closure of the main operating switch 62 will energize the control circuit 70 and thereupon energize the two heating elements 44–1 and 44–2 of the two sensors 32 and 34. The two heating elements will in turn immediately raise the temperature of the respective associated resistive elements 42–1 and 42–2 and reduce their resistance values sufficiently to enable the associated relay coils to be energized sufficiently to operate their associated relay switches.

To provide for the short starting interval during which the resistive element 42–1 of the lower sensor probe 34 is being heated to above its critical temperature, the relay for the pump motor may be provided with a corresponding delay in operation after being energized, indicated by the dash-pot MR–D.

As soon as the lower control relay CR–1 operates and closes its front contact CR–1A, the relay CR–2 for the upper sensor becomes energized and closes its own front contact CR–2A to lock itself in.

The system is now in condition for controlling the operation of the pump according to the level of the liquid in the container 21 in FIGURE 1.

The pump motor is now de-energized and will not be called on to operate the pump to pump liquid out of the receptacle 21 until the liquid level reaches the operating level of the upper sensor 32, indicated at line 80 in FIGURE 1.

When the liquid level rises to the line 75 in FIGURE 1, corresponding approximately to the bottom end of the lower sensor 34 in FIGURE 1, the sensor casing 46 and the resistive element 42 as shown in FIGURE 2, will be cooled by the rising liquid, and the resistance of the resistive element 42–1 of that lower probe sensor 34 will increase to its high value, as indicated in FIGURE 3, so that the current through the operating coil of the bottom control relay CR–1 is insufficient to hold that relay in its operated closed position. Thereupon, the coil of relay CR–1 becomes essentially de-energized and permits its front contact switch CR–1A to reopen. However, the front contact switch CR–2A of the upper relay CR–2 remains held closed and will remain so closed until the liquid level rises to the level indicated by the broken line 80 substantially at the lower end of the upper sensor 32. At that time, the resistive element 42–2 of that upper sensor 32 will be cooled to a temperature at which its high resistance value will be restored. Thereupon, the upper control relay CR–2 will become de-energized so that it opens its front contact CR–2A and closes its back contact CR–2B which is in the circuit to the relay MR for the pump motor 27.

After the lapse of the short time interval provided in that relay for the pump motor, that relay will close to connect the pump motor to its supply circuit to energize the motor 27 and to operate the pump 25, as shown in FIGURE 1. Removal of the excess liquid from the vessel 21 in FIGURE 1 will now continue so long as the pump motor 27 remains energized, which will be determined by the closed condition of the back contact CR–2B of the control relay CR–2 associated with the upper sensor 32.

As the motor-operated pump continues in operation, the level of the liquid in the vessel 21 will drop.

It is at this point that the system herein provides one of the desired features, which is to provide the operating differential previously referred to, which will permit the pump motor to continue the pumping operation until the liquid level drops not only below the level of line 80, in FIGURE 1, but also down to just below the level of line 75 at the bottom end of the lower sensor 34. The manner in which the system controls that operation may be seen upon again referring to FIGURE 4.

It will be realized that the system is now in pumping operation, due to the fact that the liquid level has gone above the level of line 80 at the lower end of the top sensor 32, with a consequent cooling of the resistor element 42–2 and the de-energization of the control relay CR–2 which thereupon closed its back contact CR–2B to the relay MR for the pump motor 27.

As the liquid level drops below the line 80 and moves away from the bottom end of the upper sensor 32, the resistive element 42–2 becomes again heated to a low resistance value which would normally be sufficient to energize the control relay CR–2, but that operation can not take place since both of the switches CR–1A and CR–2A are open. It will be realized that the switch CR–1A is open due to the fact that the control relay CR–1 is in de-energized condition because of the cool and high-resistance condition of the resistive element 42–1 in the lower probe 34 which is still immersed in the cooling liquid.

The pumping operation therefore continues until the liquid level drops to just below the broken line level 75. Thereupon, resistive element 42–1 of the lower probe 34 again becomes heated by its associated heating element 44–1 and the reduced resistance permits the relay coil of relay CR–1 to become sufficiently energized to operate. Thereupon, its front contact CR–1A closes which permits energization of the relay CR–2, due to the low resistance conditioning of the associated resistive element 42–2. Energization of the upper control relay CR–2 thereupon closes its front contact CR–2A to hold the relay locked in closed position and at the same time opens its back contact CR–2B which opens the circuit to the relay MR for the pump motor 27 and deenergizes that relay MR with the consequent opening of the circuit to the pump motor 27 shown in FIGURE 1. The motor and pump operation thereupon stops.

Thus, as shown, once the liquid level has reached the upper permitted level indicated by the broken line 80 in FIGURE 1, the pumping operation will continue until the liquid level is lowered to the line 75. Pumping operation will then be discontinued until the liquid level again rises to the level of the line 80.

Thus, the feature of the present system permits the two liquid level sensors 32 and 34 to be positioned on their respective brackets at appropriate levels to provide an operating differential within the system corresponding to the distance between the two level-indicating lines 75 and 80 in FIGURE 1.

It will be clear from the foregoing description, that the liquid level may rise and fall and fluctuate within the space below the line levels 75 and 80 so long as the liquid level does not attain or exceed the level at line 80.

The operation of the system shown in FIGURE 4 may be summarized as follows: when the liquid level is below the bottom operating line 75, both sensors are out of the liquid and the heating elements of both probes are effective to heat the related and associated resistors to permit relay coil energization. Bottom relay CR–1 will operate and immediately operate the upper relay CR–2. Therefore, both relays are energized and their respective switches operated. The motor relay is not energized and its switch is open. The pump motor is not operating.

When the liquid level rises to line 75, sensor 34 goes off and opens its relay CR–1. However, relay CR–2 holds itself locked-in. Therefore the motor is still not energized.

Until the liquid level reaches line 80, nothing happens to start the motor. The liquid level may therefore fluctuate, if the system has a natural drain or run off, and receives periodic quantities from inflow pipe 23.

Otherwise, when inflow accumulates to raise liquid level to line 80, top relay CR–2 drops out and the motor is started to pump liquid out until line level 75 is reached. The motor is then de-energized until level 80 is again reached.

Figure 5:
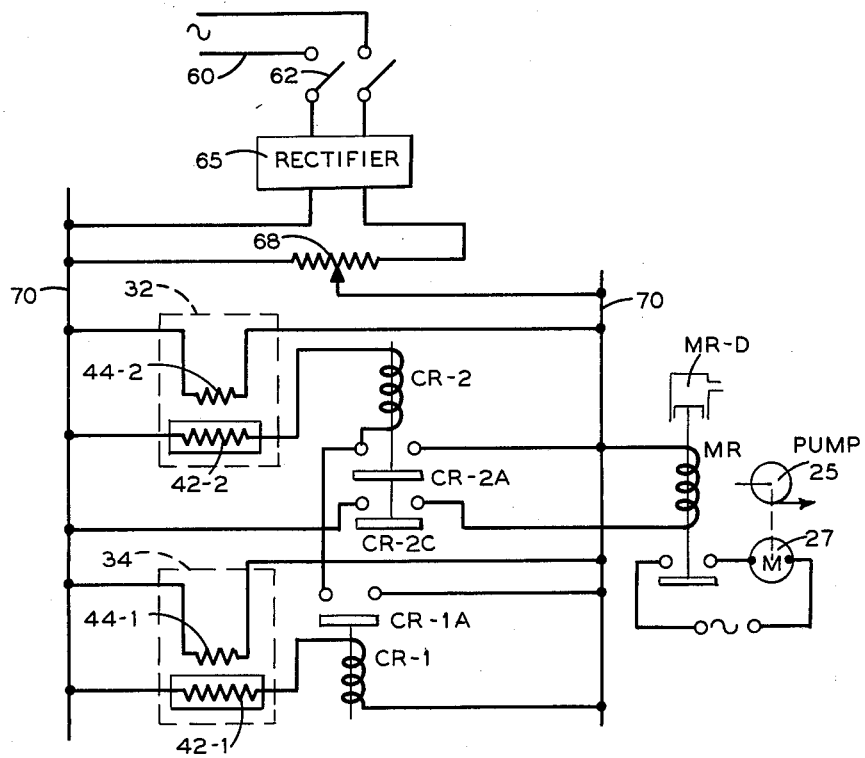
FIGURE 5 is a schematic diagram similar to FIGURE 4 with the motor control circuit for the pump arranged for normally-on operation, in which the motor is normally operated to pump liquid into the reservoir to prevent the liquid level from dropping below a predetermined level.

The system of FIGURE 4 may be readily arranged to take care of a system inverted from that in FIGURE 1. For example, if the system has a natural drain-off and requires liquid in the tank above a minimum level at level line 75, the circuitry of FIGURE 4 can be arranged to start the pump motor to supply liquid input when the level drops below line 75. The motor will continue to operate until the level of input liquid reaches the upper level line 80. For such operation, the top relay CR–2 is modified to have both switches front closing, with switch CR–2C substituted for CR–2B, as shown in FIGURE 5. In that operation, when the liquid level reaches line 80 the motor will be cut off, instead of started as in FIGURE 4.

A simple modification of the system is provided for two-pump operation, to take care of a sewage system, for example, that may be subject to peak loads.

As shown in FIGURE 6, three sensors 101, 102 and 103 are disposed in a tank 110 for receiving sewage from an inlet conduit 115. The sensors are disposed to react in response to the liquid in the tank at three levels 120, 130 and 140. Two pumps 145 and 150 serve to withdraw liquid from the bottom of the tank for delivery to two outlet conduits 152 and 154. Motors 155 and 160 drive the respective pumps 145 and 150.

The circuitry connecting the sensors and the motors is shown in FIGURE 7. A suitable power supply circuit 160 supplies energy through a switch 162 to a potentiometer 168 to energize two bus conductors 170 and 172. As in the first modification, shown in FIGURE 4, the sensors have resistive elements 142–1, 142–2 and 142–3, and heating elements 144–1, 144–2 and 144–3.

The control relays are identified in the –2– series, as 2CR–1, 2CR–2 and 2CR–3. The operations in response to changing liquid levels may now be traced.

It will be assumed the liquid level is below line 120 of FIGURE 1. All sensors are out of the liquid. All heating elements 144–1, 144–2 and 144–3 are connected to bus lines 170 and 172. All resistive elements 142–1, 142–2 and 142–3 are heated to conductivity. All three control relays can now be energized.

Bottom control relay 2CR–1 closes its two switches 2CR–1A and 2CR–1B. Switch 2CR–1A closes the circuit to coil of relay 2CR–2 which thereupon operates; and switch 2CR–1B closes the circuit to coil of relay 2CR–3 which also thereupon operates. Relay 2CR–2 closes its front contact 2CR–2A to lock itself in. Similarly, control relay 2CR–3 closes its front contact 2CR–3A to lock itself in. At the same time, those two control relays open their back contacts 2CR–2B and 2CR–3B to keep the motor control relays MR–1 and MR–2 from operating to connect the pump motors 155 and 160 to their power supply lines.

As the water level in the tank 110 rises and reaches bottom of sensor 101, resistive element 142–1 increases resistance and causes control relay 2CR–1 to drop out and open its contacts 2CR–A and 2CR–B. This does not affect control relays 2CR–2 and 2CR–3 which are locked-in through their own front contacts.

As the water level continues to rise to line 130 at the middle sensor 102, the sensor cools and relay 2CR–2 drops out and closes its back contact 2CR–2C to close the circuit to motor relay MR–1. After the short interval of the dash-pot operation, the motor relay MR–1 connects motor 155 to its supply source, and pump 145 is started into operation.

So long as the middle sensor remains immersed and cool, the motor 155 continues to operate the pump. If the liquid level drops below line 130, the sensor 102 reheats and operates control relay 2CR–2 to open the circuit of the motor relay MR–1. The motor and pump stop.

However, if the liquid level continues to rise and reaches to or above line level 140, the top sensor 103 is cooled and causes top control relay 2CR–3 to drop out, and close its back contact 2CR–3C to the circuit of second motor relay MR–2. The second motor 160 is thereupon connected to its supply source and starts to operate second pump 150.

With both pumps 145 and 150 operating, the water level drops. As it drops below level line 140, top relay 2CR–3 stays dropped out. Pump 150 continues to pump, helping pump 145.

As the liquid drops to and below level line 130, middle relay 2CR–2 also stays dropped out, since the priming circuit is still open at the contact 2CR–1A of bottom relay 2CR–1. Both pumps continue to operate.

When the liquid level drops to and below level line 120, bottom control relay 2CR–1 is energized and its closing front contacts close the other two control relays 2CR–2 and 2CR–3. Their back contacts open to open the two motor relays MR–1 and MR–2 to de-energize motors 155 and 160. All pumping stops.

Thus, by means of the sensors disclosed herein, a simple and rugged control system is made available to establish a desired operating differential in a pumping system.

The circuitry and the components may be variously modified within the invention and without departing from its spirit and scope as defined in the claims.

What is claimed is:

1. A pump control system for a liquid reservoir, comprising
    a pump and a motor to operate said pump;
    a source of voltage;
    a first sensor positioned to sense a low liquid level in said reservoir;
    a second sensor positioned to sense a high liquid level in said reservoir;
    a first relay responsive to said first sensor and having a normally open relay front switch and connected to be energized through said first sensor to operate said open front switch to closed position whenever the liquid level is below said first sensor;
    a second relay having a normally open relay front switch operable to closed position when the relay is energized, and having a normally closed relay back switch operable to open position when the relay is energized;
    means connecting said second sensor to said second relay whereby said second relay will be de-energized when said liquid level reaches and affects said second sensor;
    means connecting both said relay front switches in parallel to energize the second relay from said voltage source;
    and means connecting said second relay back switch in an external circuit to control the pump motor.

2. A level-sensing pump control system employing two motor-driven pumps for controlling the liquid level in a reservoir, said level-sensing control system comprising
    two motor-driven pumps;
    a voltage supply circuit;
    a first or low level sensor for disposition at a low level in the reservoir;
    a second or intermediate level sensor for disposition at an intermediate level in the reservoir;
    a third or high level sensor for disposition at a high level in the reservoir;
    each said sensor comprising a heating element and a heat-responsive impedance element which is responsive to said heating element and disposed and characterized to be heated to a low-resistance value while the liquid level is below said sensor impedance, but to return to a high-resistance value in spite of said heating element when cooled by the liquid in said reservoir, said heating element being inadequate to heat said impedance element to low-resistance value when said impedance is cooled by said liquid;
    a first sensor relay having an operating coil and normally open switch means operable by said operating coil to closed position;
    a second sensor relay having an operating coil and a front switch normally open and a back switch normally closed, both switches being operable to their opposite respective closed and open positions when said second sensor relay coil is energized;
    a third sensor relay having an operating coil and a front switch normally open and a back switch normally closed, both switches being operable to their opposite respective closed and open positions when said third sensor relay coil is energized;
    means connecting the second sensor relay coil through a first switch of the first sensor relay to said voltage supply circuit;
    means connecting the third sensor relay coil through a second switch of said first sensor relay to said voltage supply circuit;
    means connecting the front switch of the second sensor relay in parallel with the first sensor relay front switch connected in circuit with the second sensor relay coil;
    means connecting the front switch of the third sensor relay in parallel with the first sensor relay front which connected in the circuit with the third sensor relay coil;
    a first motor-circuit controlling relay having an operating coil and a switch to control the connection of a power circuit to the driving motor of said first pump;
    means connecting said operating coil of said first controlling relay to said voltage supply circuit through the normally closed back switch of said second relay;

a second motor-circuit controlling relay having an operating coil and a switch to control the connection of said power circuit to the driving motor of said second pump;

and means connecting said operating coil of said second controlling relay to said voltage supply circuit through the normally closed back switch of said second sensor relay.

3. A level sensing system, as in claim 2, including means for introducing a time delay in the operation of each motor-circuit controlling relay to enable the associated sensor relay to operate first in a predetermined sequence to prevent false starts of either pump motor.

4. A motor-operated pump-control system for controlling the level of a liquid in a reservoir, said system comprising a pump and a motor to operate the pump;

an electric supply circuit;

a first sensor to sense a low liquid level in said reservoir, and comprising an impedance element characterized to have a high resistance value when engaged and cooled by a liquid in said reservoir and to have a low resistance value when heated and not engaged by liquid in said reservoir;

a heating element for said impedance element;

a first relay having an operating coil and a normally open front switch, the operating coil being connected in series with said first sensor element across the electric supply circuit;

a second sensor to sense a high liquid level in said reservoir and comprising an impedance element having characteristics similar to those of said first sensor;

a second relay having an operating coil, a normally open front switch and a normally closed back switch, said operating coil being connected to said electric supply circuit in series with said second sensor element through the front switch of said first relay and the front switch of said second relay in parallel, whereby operation of said first relay sets up an energizing circuit through its front switch for the operating coil of said second relay, and the operation of said second relay closes its front switch to establish a lock-in circuit for said operating coil of said second relay so long as said second sensor is uncooled and at low resistance, and whereby such operation of said second relay opens its back contact and holds said back contact open so long as it is so locked in operated position;

and a motor-control relay having an operating coil and a switch for controlling the operating circuit to the motor of the pump, said operating coil being adapted to be connected to said supply circuit through said back switch of said second relay.

5. A motor-operated pump-control system, as in claim 4, in which said motor-control relay embodies time-delay means for holding said motor-control relay from operating for a short time interval sufficient to enable said second relay to operate and lock-in to open the circuit of said motor-control relay coil, while the liquid level is rising in said reservoir from below said low level, to prevent a momentary unwanted operation of said motor.

6. A motor-operated pump-control system, as in claim 4, including time-delay means for delaying the operation of said motor-control relay, to permit selective sequence control operation of said second relay prior to operation of said motor-control relay, when the liquid level rises from below said lower level, thereby to prevent momentary unwanted operation of said motor control relay with consequent operation of said motor.

7. A pump control system for controlling the level of liquid in a reservoir, said system comprising a pump operable by an electric motor to move liquid relative to said reservoir;

an electric supply circuit;

a first sensor having a heating element and an impedance element to be heated by said heating element, said heating element having a low resistance when heated and having a high resistance when engaged and cooled by liquid in said reservoir;

first means connecting said first sensor heating element to said electric supply circuit.

means for positioning said first sensor to detect the liquid at a desired first level by the cooling effect of said liquid;

a second sensor similar in construction to said first sensor and having a similar heating element and a similar impedance element;

second means connecting said second sensor heating element to said electric supply circuit;

a first relay having an operating coil and a normally open front switch movable to closed position when the coil is adequately energized;

a second relay having an operating coil and a normally open front switch and normally closed back switch, both switches being respectively operable to their opposite positions;

a third relay having an operating and a front closing switch normally open;

means connecting the first sensor impedance element in series with the operating coil of the first relay directly to the supply circuit;

means connecting the second sensor impedance element in series with the operating coil of the second relay and through the front switch of the first relay to the supply circuit;

means connecting the front switch of the second relay to establish a lock-in circuit for the operating coil of said second relay;

means connecting the operating coil of the third relay in series with the back switch of the second relay to the supply circuit;

and means controlled by the switch of said third relay for controlling the energization of the electric motor for the pump.

8. A pump control system, as in claim 7, in which said third relay embodies time-delay means for introducing a time delay in the closures of the switch of said third relay for energizing said pump motor.

9. A pump control system, as in claim 8, including further means for introducing a time delay in energizing the pump motor in order thereby to enable the operation of the second relay to be effective to prevent operation of the third relay and thus to prevent undesired energization and operation of the electric motor for the pump.

10. A motor-operated pump-control system for controlling the level of liquid in a reservoir, said system comprising an electric motor;

a pump operable by said electric motor to move liquid relative to said reservoir;

an electric supply circuit;

a first sensor having a heating element and a heat-sensitive negative-resistance impedance to be heated by said heating element;

means for positioning said first sensor at a desired first level at which the liquid is to be detected by the cooling effect of the liquid on the resistance value of the first sensor-impedance;

a second sensor having a heating element and a heat-sensitive negative-resistance impedance to be heated thereby;

means connecting the heating elements of both sensors to the electric supply circuit to be constantly energized so long as the system is operating;

means for positioning said second sensor at a desired second level at which the liquid is to be detected by the cooling effect of the liquid on the resistance value of the second sensor-impedance;

a first current-operable relay coil connected in circuit with said first sensor-impedance.

a second current-operable relay coil connected in circuit with said second sensor-impedance;

switch means responsive to said first relay coil for connecting said second relay coil and said sensor-impedance to said supply circuit;

switch means responsive to said second relay coil for setting up a self-lock-in circuit for said second relay coil;

switch means for controlling said electric motor to operate said pump;

and auxiliary switch means responsive to said second relay coil for controlling the operation of said motor-controlling switch means.

11. A pump-control system, as in claim 10, including time-delay means for introducing a time delay in the operation of said motor-controlling switch means.

References Cited by the Examiner
UNITED STATES PATENTS

| | | | |
|---|---|---|---|
| 2,160,062 | 3/1939 | Drake | 103—26 X |
| 2,697,196 | 12/1954 | Harper | 103—26 X |
| 2,797,702 | 7/1957 | Martin | 103—11 X |
| 2,924,234 | 2/1960 | Wilson | 103—26 X |
| 2,975,347 | 3/1961 | Schaefer | 103—25 X |

LAURENCE V. EFNER, *Primary Examiner.*